J. F. BOOSE.
CULTIVATOR SHOVEL.
APPLICATION FILED SEPT. 28, 1917.
1,260,958.
Patented Mar. 26, 1918.
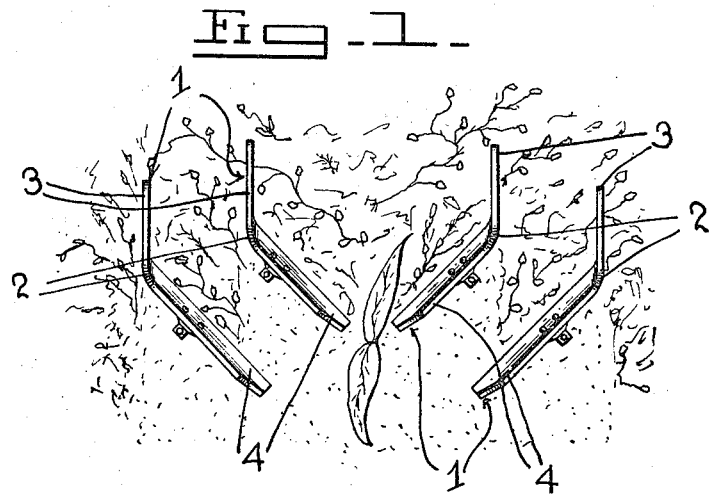
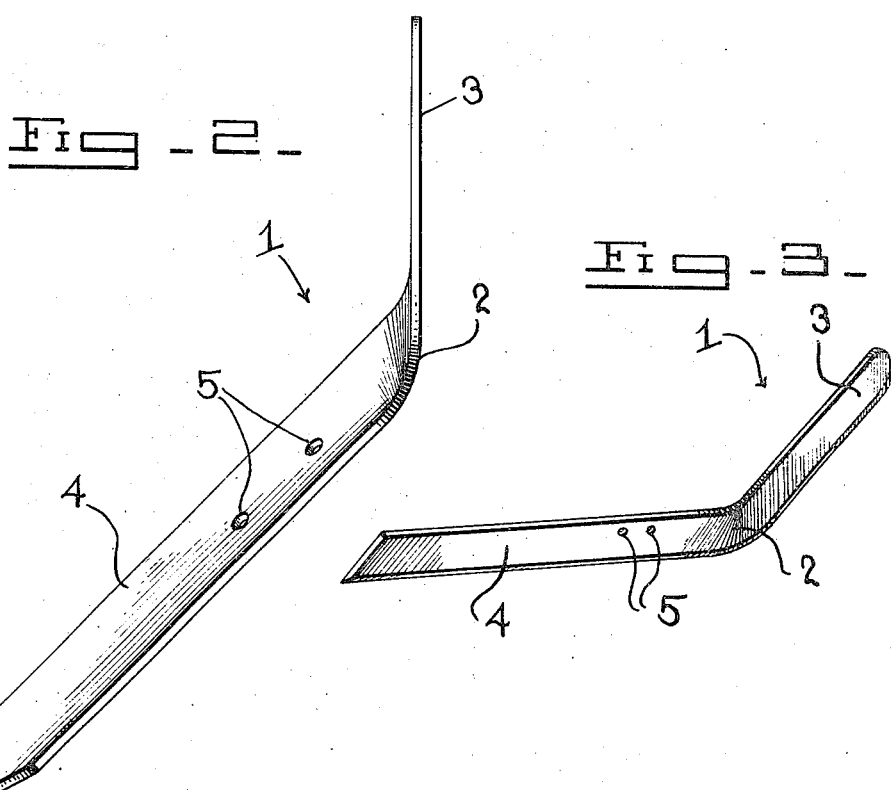
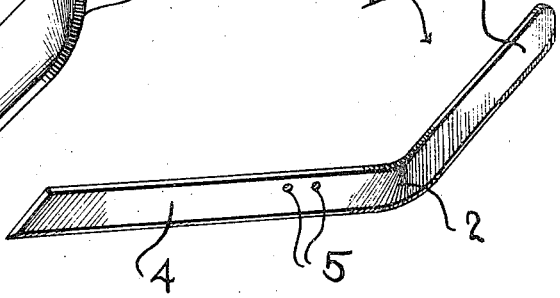
Inventor
J. F. Boose
By Victor J. Evans
Attorney
Witness
L. B. James
I. Wilcox

UNITED STATES PATENT OFFICE.

JAMES F. BOOSE, OF WESTVILLE, ILLINOIS.

CULTIVATOR-SHOVEL.

1,260,958.  Specification of Letters Patent.  Patented Mar. 26, 1918.

Application filed September 28, 1917. Serial No. 193,797.

*To all whom it may concern:*

Be it known that I, JAMES F. BOOSE, a citizen of the United States, residing at Westville, in the county of Vermilion and State of Illinois, have invented new and useful Improvements in Cultivator-Shovels, of which the following is a specification.

This invention relates to cultivator shovels and it consists in the novel features hereinafter described and claimed.

An object of the invention is to provide a shovel of the character indicated which is of a design especially adapted to be used for efficiently and readily removing vines and weeds from the surface of the soil.

It is a known fact that the surface shovels which are now employed destroy the vines between rows of corn but there has always been difficulty in view of the fact that the vines after being partially cut drag over the shovel and lodge in bunches around the shanks or standards which connect them with the cultivator frame. The shovel hereinafter described is attached in the same manner upon the shank of the plow and occupies approximately the same position but instead of the ground end of the shovel or blade rooting through the soil beneath the plant or the vine it protrudes in an upward and forward direction and travels in a line parallel with the line of draft of the implement or parallel with the row of corn. Also the front portion of the blade which projects above the soil is twisted or bent at an angle to the portion of the blade which engages the soil in a manner to hold the forwardly projecting portion in a vertical plane and in that its lower end is sharp a slicing action is had upon the vines and this severs the vines at the opposite sides of the said projecting portion whereby the vines cannot drag or accumulate upon the shovel.

In the accompanying drawing:—

Figure 1 is a plan view illustrating the shovels in position about a row of plants;

Fig. 2 is an edge view of one of the shovels;

Fig. 3 is a perspective view of one end of the shovel.

The shovel 1 is formed from a single piece of metal and the said piece is provided at 2 with a bend or twist thereby providing a forward portion 3 and a blade portion 4. These portions are disposed at an acute angle with relation to each other and the portion 4 is provided with openings 5 through which bolts might be passed for securing the shovels in position upon a shank or standard. When the shovel is in position upon a plow the portion 3 is disposed in a vertical plane and is upwardly and forwardly inclined. The portion 4 is disposed in a plane at an angle with relation to a horizontal and the lower edges of the portions 3 and 4 are sharp.

As the shovel moves along the soil the portion 3 comes in contact with the vines and plants and cuts or divides them while the portion 4 passes under the roots of the vines or plants and thus the plants are destroyed or mutilated and by reason of the specific disposition of the portion the plants will not have a tendency to accumulate or bunch about the shovel or the shank upon which it is mounted.

Having described the invention what is claimed is:—

A cultivator shovel comprising a single piece of metal provided at a point between its ends with a twist whereby the said piece of metal is provided with an upwardly extending forward portion and a rear blade portion, the said forward portion normally lying in a vertical plane and the blade portion having its median longitudinal dimension disposed at an acute angle with relation to the corresponding dimension of the forward portion, the blade portion being normally disposed at an angle with relation to a horizontal and the lower edges of the forward and blade portions being sharp, the said blade portion being provided at a point between the twist and its free end with means for attachment to a support whereby the forward portion is held in position in the absence of an attachment.

In testimony whereof I affix my signature.

JAMES F. BOOSE.

Copies of this patent may be obtained for five cents each, by addressing the "Commissioner of Patents, Washington, D. C."